(12) United States Patent
Kontani et al.

(10) Patent No.: US 7,166,811 B2
(45) Date of Patent: Jan. 23, 2007

(54) LEVER SWITCH ASSEMBLY FOR A VEHICLE

(75) Inventors: Masaki Kontani, Tsuruga (JP); Takeshi Fujii, Tsuruga (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 11/066,578

(22) Filed: Feb. 25, 2005

(65) Prior Publication Data

US 2005/0236259 A1    Oct. 27, 2005

(30) Foreign Application Priority Data

Apr. 21, 2004   (JP) .............................. 2004-125207

(51) Int. Cl.
*H01H 9/00* (2006.01)
(52) U.S. Cl. ................................. 200/61.54; 200/61.27
(58) Field of Classification Search ............ 200/61.54, 200/61.27–61.38, 61.57, 11 R, 565
See application file for complete search history.

(56) References Cited

U.S. PATENT DOCUMENTS

| | | | | |
|---|---|---|---|---|
| 6,020,563 A | * | 2/2000 | Risk et al. ............... | 200/61.54 |
| 6,069,329 A | * | 5/2000 | Weiss et al. .............. | 200/61.3 |
| 6,300,852 B1 | * | 10/2001 | Kato .......................... | 335/170 |
| 6,518,524 B1 | * | 2/2003 | Brandt et al. ............ | 200/61.54 |
| 6,534,732 B1 | * | 3/2003 | Karasik et al. .......... | 200/61.54 |
| 6,548,770 B1 | * | 4/2003 | Stewart et al. ........... | 200/61.27 |
| 6,624,364 B1 | * | 9/2003 | Liburdi .................... | 200/61.27 |

FOREIGN PATENT DOCUMENTS

JP    2003-118587 A    4/2003

* cited by examiner

*Primary Examiner*—Elvin G. Enad
*Assistant Examiner*—Lisa Klaus
(74) *Attorney, Agent, or Firm*—Rossi, Kimms & McDowell, LLP

(57) ABSTRACT

A lever switch for vehicle, which can be produced thin and which operation is easy and ensured is provided. A lever is formed in substantially a linear shape, having at an end thereof an operating part sticking out of a case and at an other end thereof a driving part of which a middle part is movably held in the case, and a resilient push force mechanism composed of a coil spring, a pin and a saving cam is disposed between an end of a driving part of lever and an inside wall of the case, constituting the vehicle lever switch.

7 Claims, 4 Drawing Sheets

LEVER SWITCH ASSEMBLY FOR A VEHICLE

TECHNICAL FIELD

This invention relates to a lever switch for vehicle, which is primarily installed near a steering wheel of automobile and is used for shifting automatic transmission or operating various electronic devices.

BACKGROUND OF THE INVENTION

In recent years, in automatic transmission (hereinafter, called AT) of automobile, manual shifting of a switch installed near a steering wheel (hereinafter, called SWH)—manually operating the switch with a finger while holding the SWH—is increasing in addition to shifting a range by operating a floor-shift or a column-shift.

A conventional vehicle switch is explained by using FIG. 5. FIG. 5 is a plain view of SWH 1 installing the conventional vehicle switch. Pad 2 incorporates air bag 5, and spoke 3 is disposed between SWH 1 and pad 2.

In a right side and a left side of spoke 3, operating part 4A and 4B are positioned; and on a rear side of operating part 4A and 4B, a plurality of push vehicle switches 4 including a switch contact (not illustrated) are incorporated.

SWH 1 is fixed to a steering shaft (not illustrated) extending from a vehicle's main body. The switch contact is connected to an electronic circuit of the automobile body.

In the above constitution and the automobile is driven with a shift lever shifted to a predetermined position, if upper side operating part 4A with a "+" mark is pressed by for instance a thumb while holding the SWH, electrical switching of the internal switch contact is made sending an electric signal to the electronic circuit of the automobile body, and if a transmission gear of the AT is in $4^{th}$ gear at the time, the gear is shifted from $4^{th}$ gear to $5^{th}$ gear.

Then, if the finger leaves operating part 4A and moves to pressing a lower side of operating part 4B having a "−" mark, electrical switching of the switch contact is made, and the gear is shifted from $5^{th}$ gear down to $4^{th}$ gear.

The above marks "+" and "−" indicate increase and decrease. If the push work of operating part 4B and 4A is repeated, the repeated electrical switch signal of the contact shifts the transmission gear down from $4^{th}$ gear to $3^{rd}$ gear then to $2^{nd}$ and $1^{st}$ gear or up the gear, in response to the pushing operation.

The vehicle switch having above constitution is disclosed by Japanese Patent Laid-Open Application No. 2003-118587.

However, with above conventional vehicle switch, one has to identify visually the operating place before actually working on operating part 4A and 4B. Moreover, when operating a different operating part, one has to leave eyes once from the first operating part then to move to the other part. Because of it, it is difficult to operate the vehicle switch and there is a possibility that miss-operation is easily caused.

The invention is to solve above conventional problems and to provide a lever switch for vehicle (hereafter, LSV) having an easy operation and an ensured operational work.

SUMMARY OF THE INVENTION

The invention provides a lever switch for vehicle composed of a case in substantially a box shape; a lever having at an end thereof an operating part sticking out of the case, and at an other end thereof a driving part of which a middle part is movably held in the case; a switch contact electrically switched with a rocking motion of the lever, and a resilient push force mechanism disposed between the lever and an inside wall of the case, wherein the lever is formed in substantially a linear shape, and the resilient push force mechanism is disposed at an end of the driving part of the lever.

DETAILED DESCRIPTION OF PREFERRED EMBODIMENT

A lever switch for vehicle (LSV) according to the present invention includes a case in substantially a box shape; a lever having at an end thereof an operating part sticking out of the case, and at an other end thereof a driving part of which a middle part is movably held in the case; a switch contact being electrically switched with a rocking motion of the lever, and a resilient push force mechanism disposed between the lever and an inside wall of the case. The lever is made in substantially a linear shape, and a resilient push force mechanism is disposed at an end of the driving part. With this constitution, the switch is made thin. The switch is installed in a pad or at a side of a spoke of a SWH and an operating part of the lever can be pushed forward or backward while holding a SWH, therefore the LSV with an easy and ensured operation is obtained.

The LSV according to the present invention has an irregular part on at least one of a front part and a rear part of the operating part preventing a finger to slip over the operating part when operating the switch, so that a further ensured operation is realized.

Moreover, the LSV according to the invention has a plurality of switch contacts which are disposed in parallel with the driving part and oppositely placed at a predetermined space with regard to a rocking axis. Therefore, the switch is made thinner than in a case where the switch contacts are disposed crossing at right angles.

Figure 1:
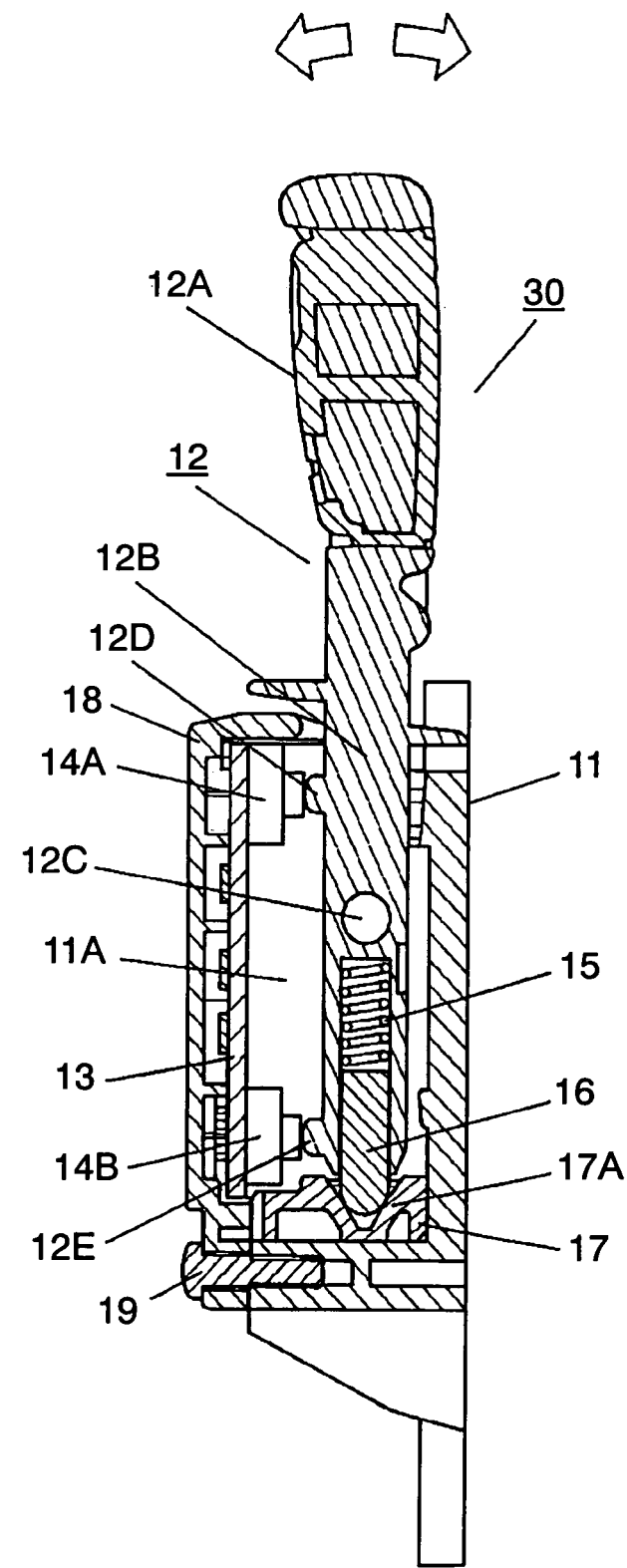
FIG. 1 is a cross section view of a LSV in accordance with an exemplary embodiment of the present invention.
Figure 2:
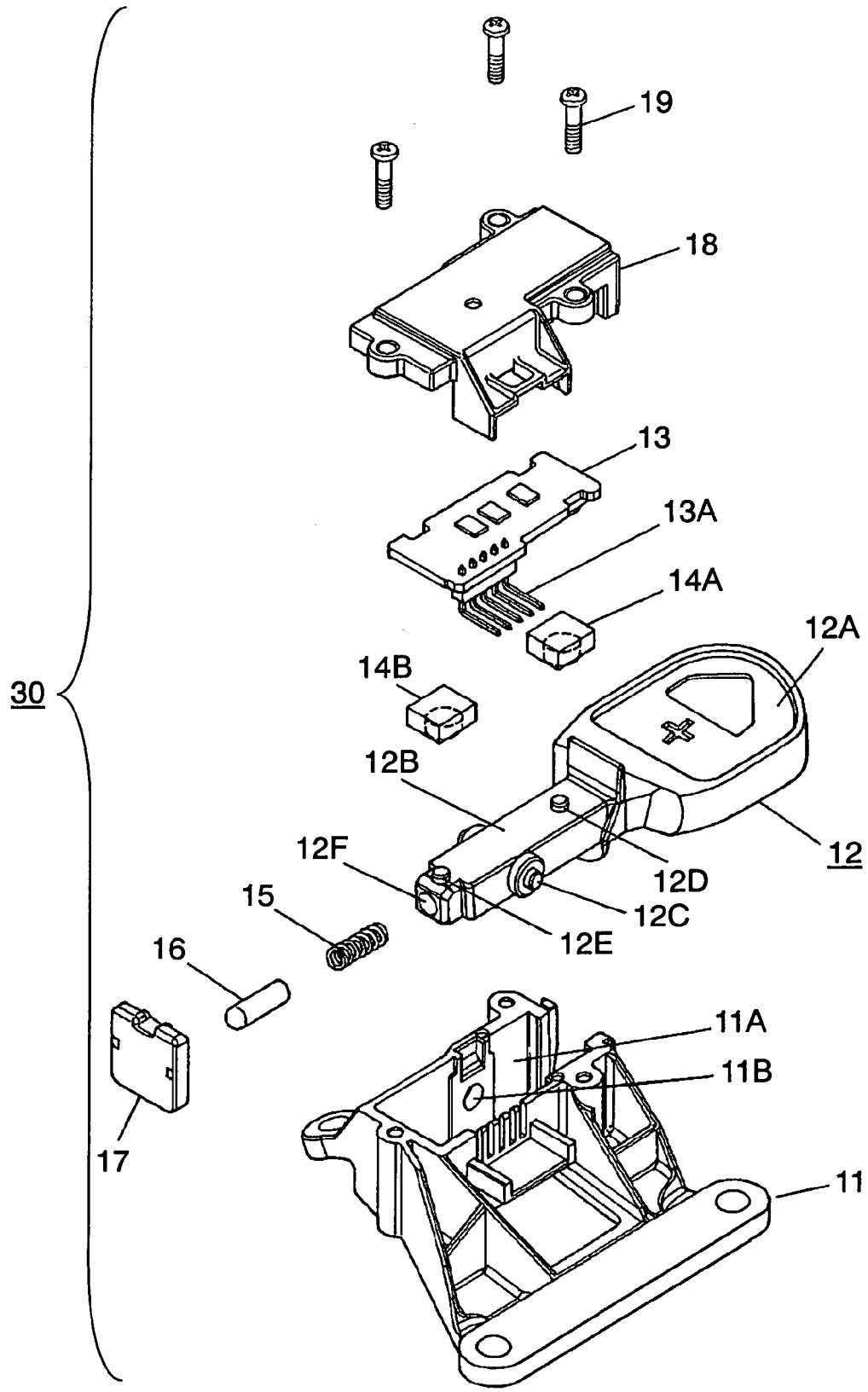
FIG. 2 is an exploded perspective view of the LSV in accordance with the exemplary embodiment of the present invention.
Figure 3:
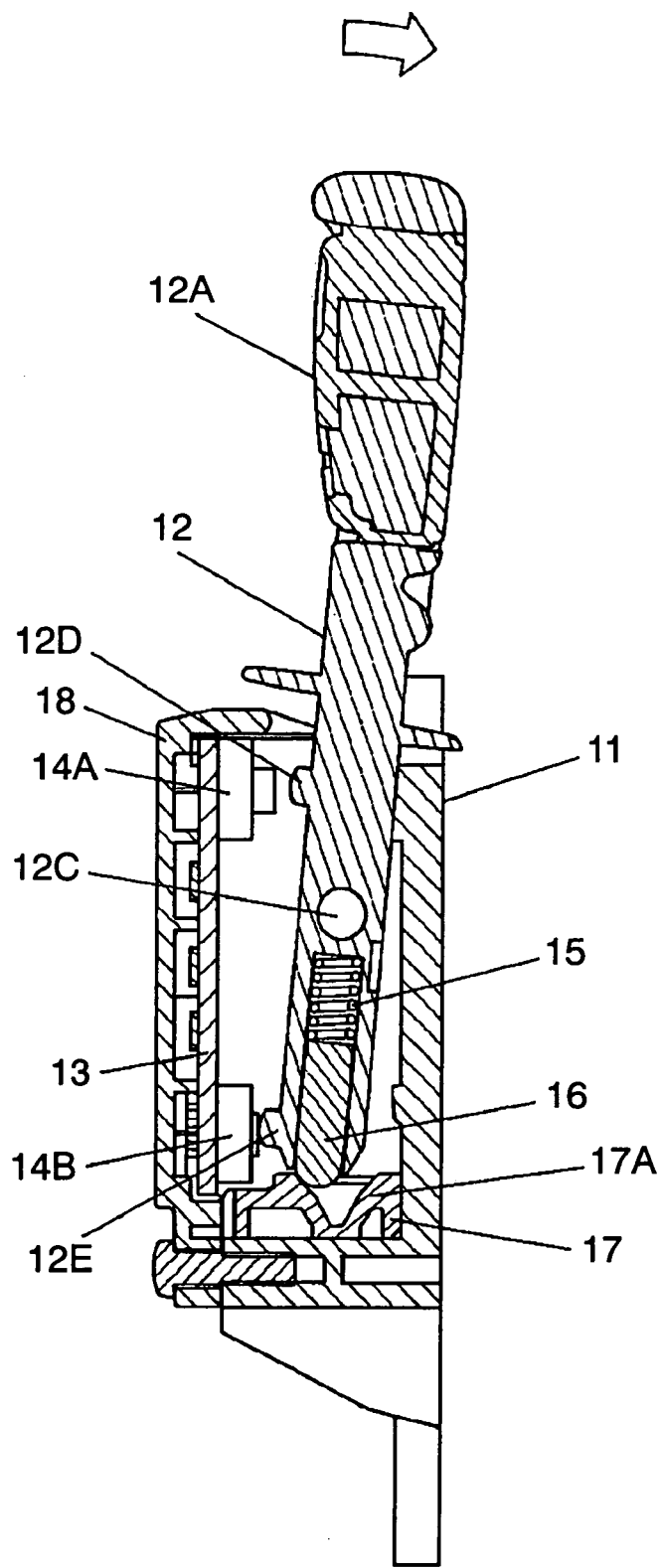
FIG. 3 is a cross section view of the LSV in motion in accordance with the exemplary embodiment of the present invention.

The exemplary embodiment of the invention is described in detail below using FIG. 1 to FIG. 4. Arrow marks in FIGS. 1 and 3 show rocking direction of the lever.

Case 11 is made of polyoxymethylene (POM) or other insulating resin, and is made in substantially a box shape. Lever 12 is made of polybutyleneterephthalate (PBT), polyamide (PA) or other insulating resin. Insulating resin is not limited to above listed material, and other material can as well be all used as long as the material has a superb mechanical strength, a moldability and an insulating resistance.

Lever 12 is formed in substantially a linear shape, and an operating part 12A in substantially an oval shape with one end thereof extending upward out of an upper part of case 11.

At an other end of lever 12, driving part 12B is formed in substantially a square-bar shape. Shaft 12C extending at a middle part of driving part 12B in a direction of width of the driving part is held with a pair of shaft holding parts 11B formed in a hollow shape in holder 11A of case 11, holding lever 12 in case 11 and enabling the lever to be rocked. Operating part 12A is formed by integration with an extended portion of driving part 12B, using rubber, thermoplastic elastomer or other synthetic resin, which gives a non-slidable surface. At the front side and the rear side of operating part 12A, various irregular portions are formed, a concave serving as a functional display indicating "+" and a plurality of substantially spherical shapes, for examples. Printed wiring board (PWB) 13 patterned by a plurality of wiring patterns (not illustrated) on both sides of the substrate and mounted by a chip and other different electronic components is placed in parallel with a side-face of driving part 12B. PWB 13 is made of paper phenol or glass epoxy resin.

On PWB 13 facing lever 12, a plurality of push switches (PSWs) including 14A and 14B incorporating the switch contact are mounted in parallel with driving part 12B separated by a predetermined interval and opposing to shaft 12C being a rocking axis.

The predetermined interval means a distance from shaft 12A, 14 mm for instance, with which the switches are oppositely placed.

The plurality of push switches is defined as at least 2 pcs, and a maximum number is determined by the structure of the lever switch.

Depressing parts 12D and 12E extruding from driving part 12B come into contact with push button of PSW 14A and 14B. A plurality of connecting terminals 13A which are connected to the PSWs and other different electronic components and are sticking out of a side wall of holder 11A are affixed to PWB 13, Pin 16 made of metal represented by brass in substantially a column shape and coil spring 15 made of a slightly twisted metal wire are inserted into hole 12F formed at an end of lever 12.

Saving cam 17 made of insulating resin represented by POM is installed at a lower end of holder 11A of case 11. A tip of pin 16 which is in substantially a spherical shape and is resiliently pushed by coil spring 15 comes into contact with cam part 17A in substantially an irregular shape in an upper part of saving cam 17, forming a resilient push force mechanism between lever 12 and an inside wall of case 11.

Cover 18 made of insulating resin represented by POM covers an opening of holder 11A of case 11 holding driving part 12B of lever 12, PWB 13 and saving cam 17. The cover is fixed to case 11 with screws 19, constituting LSV 30.

Figure 4:
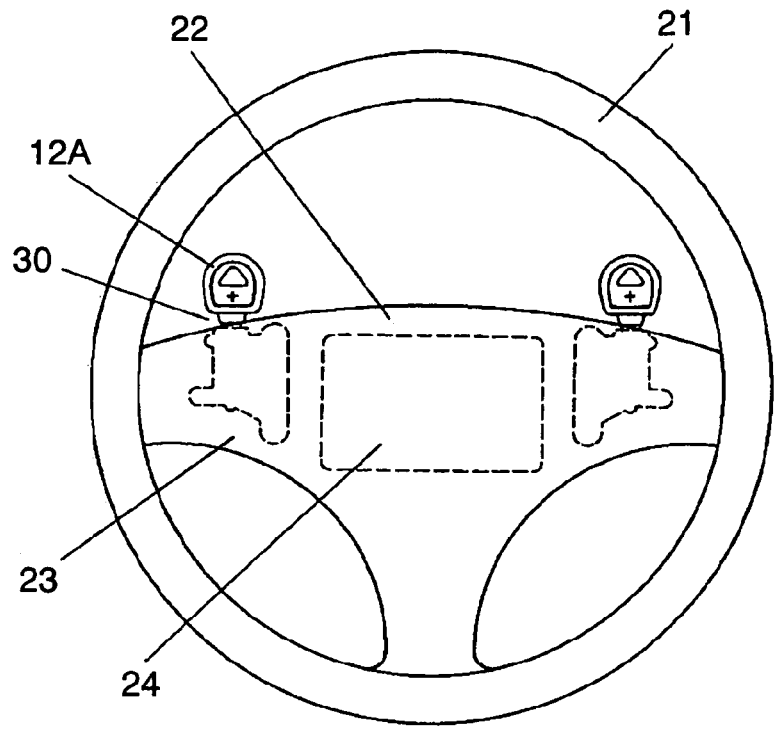
FIG. 4 is a plain view of a SWH incorporating the LSV in accordance with the exemplary embodiment of the present invention.
Figure 5:
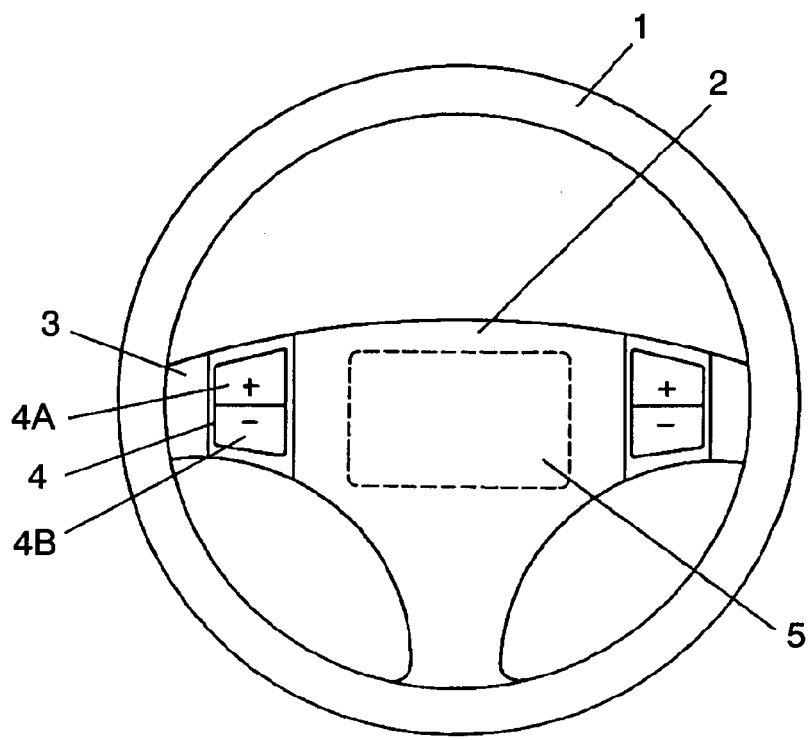
FIG. 5 is a plain view of a SWH incorporating a conventional switch for vehicle.

LSV 30 is fixed to upper left and right sides of spoke 23 between steering wheel 21 and pad 22 incorporating airbag 24, protruding operating part 12A outside, as shown by the plain view of SWH in FIG. 4.

The SWH is fixed to a steering column (not illustrated) extended from the vehicle main body. The switch contacts of PSWs (14A and 14B) are coupled with electronic circuits (not illustrated) of the vehicle body through a connector (not illustrated) attached to connecting terminal 13A.

With above constitution, when the front side of operating part 12A of LSV 30 is pushed forward by a left hand thumb as an example while driving the automobile by holding the SWH with a shift lever switched to a prescribed position, lever 12 is rocked with regard to shaft-holding part 11B that serves as a fulcrum. At the same time, the tip of pin 16 which is resiliently pushed by coil spring 15 and come into contact with a depressed portion in a center of cam part 17A of saving cam 17—as shown in FIG. 1, glidingly moves up a front side slope of cam part 17A by keep coming into contact with the slope and going against the resilient push force of coil spring 15—which is shown in the cross-sectional view of FIG. 3. Concurrently, depressing-part 12E which is a lower part of driving part 12B presses a push button of push switch 14B, electrically switching PSW 14B.

An electric signal from the switch contact is then sent to the electronic circuit of the automobile body, and if a transmission is in $4^{th}$ gear at the time, the gear is up-shifted from $4^{th}$ to $5^{th}$.

In this state, if the pressing finger leaves operating part 12A, pin 16 moves back to the depressed portion in the center by keep coming into contact with the front side slope of saving cam 17, and lever 12 which is resiliently pushed by coil spring 15 automatically returns to a neutral position as shown in FIG. 1.

Moreover, if the rear side of operating part 12A is pressed backward with a left hand forefinger or a middle finger, lever 12 is rocked in a reversal direction, concurrently depressing-part 12D in an upper part of driving part 12B depresses PSW 14A, sending an electric signal to the electric circuit of the automobile therewith shifting the gear from $5^{th}$ down to $4^{th}$.

If forward or backward pressing action is repeatedly applied to operating part 12A, the electrical switching of the switch contact of PSWs 14A and 14B is correspondingly repeated, with the electric signal shifting the transmission gear down from $4^{th}$ to $3^{rd}$ then to $2^{nd}$ and $1^{st}$ or shifting the gear up, according to the pressing operation.

According to the exemplary embodiment of the present invention, LSV 30 is, as described, composed of lever 12 in substantially a linear shape having at one end thereof operating part 12A projecting out of case 11, and at an other end thereof driving part 12B of which a middle part is held in case 11 being enabled to be rocked; and the resilient push force mechanism composed of coil spring 15, pin 16 and saving cam 17, which is placed between the end of driving part 12B and the inside wall of case 11. As a result, the switch as a whole is made thinner compared with a switch which has wound driving part 12B or has a resilient push force mechanism at a side of driving part 12B.

By installing LSV 30 in spoke 23 or at a side of pad 22 of SWH, the two fingers can easily press the front side or the rear side of operating part 12A of lever 12 while holding the SWH for instance.

As mentioned, because it is unnecessary to confirm visually the location of the controlling spot or leave a finger from the control spot before repositioning to a different spot, switching operation is easy and an ensured operational work without malfunction is made possible.

Moreover, by installing LSV 30 in spoke 23 or at a side of pad 22, various switches other than to control the manual shift of AT can be installed for controlling different kinds of electronic devices on board of the automobile including an air-conditioner and audio equipment.

Still more, by forming various irregular portions on the front side and the rear side of operating part 12A, such as a concave having a functional mark of "+" and a plurality of substantially spherical shapes, fingers are prevented from slipping over operating part 12A, which further ensures the operation.

Still further, by disposing a plurality of switch contacts including PSWs 14A and 14B in parallel with driving part 12B oppositely facing to a rocking axis at a predetermined distance, the switch is made thinner than where the switch contacts are positioned crossing to driving part 12B at right angles.

The present invention provides a LVS which can be produced thinner and of which operation is easy and ensured. The switch can be installed near a SWH of vehicle to be widely used for shifting AT and controlling a variety of electronic devices.

What is claimed is:

1. A lever switch assembly for a vehicle, comprising:
an enclosed case having an opening;
a lever pivotally mounted inside the enclosed case and having an operating part thereof extending out of the case through the opening;
an electrical switch disposed inside the enclosed case and actuable with a rocking motion of the lever; and
a resilient push force mechanism disposed between the lever and an inside wall of the enclosed case,
wherein the lever has a substantially linear shape, and
wherein the resilient push force mechanism is disposed at an end of the lever opposite to the operating part.

2. The lever switch assembly for a vehicle according to claim 1, wherein an irregular portion is formed on at least one of a front side and a rear side of the operating part.

3. The lever switch assembly for a vehicle according to claim 1, wherein a plurality of electrical switches are disposed parallel with the lever and spaced from pivot axis of the lever at a predetermined distance.

4. The lever switch assembly for a vehicle according to claim 3, wherein each of the electrical switches is a push switch having a push button, the lever includes a plurality of depressing parts, and the push buttons of the push switches are disposed opposing to the depressing parts of the lever.

5. The lever switch assembly for a vehicle according to claim 4, wherein the push buttons of the push switches are contactable with the depressing parts of the lever.

6. The lever switch assembly for a vehicle according to claim 1, wherein the electrical switch is a push switch having a push button, the lever includes a depressing part, and the push button of the push switch is disposed opposing to the depressing part of the lever.

7. The lever switch assembly for a vehicle according to claim 6, wherein the push button of the push switch is contactable with the depressing part of the lever.

* * * * *